A. F. KNIGHT.
PREVENTION OF OBJECTIONABLE VOLTAGE FLUCTUATIONS ON DISTRIBUTING SYSTEMS.
APPLICATION FILED OCT. 6, 1917.
1,365,502. Patented Jan. 11, 1921.
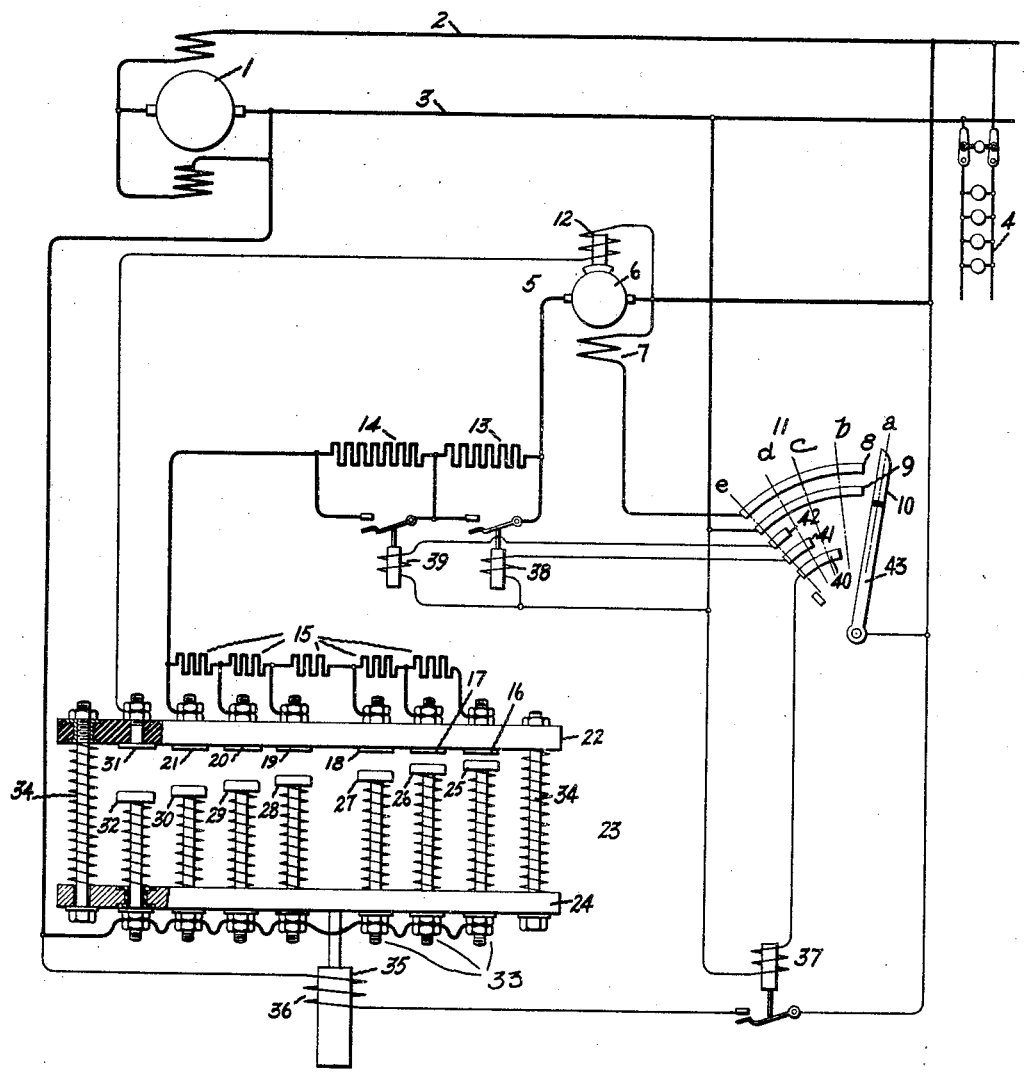
Inventor:
Arthur F. Knight,
by
His Attorney.

UNITED STATES PATENT OFFICE.

ARTHUR F. KNIGHT, OF SCHENECTADY, NEW YORK, ASSIGNOR TO GENERAL ELECTRIC COMPANY, A CORPORATION OF NEW YORK.

PREVENTION OF OBJECTIONABLE VOLTAGE FLUCTUATIONS ON DISTRIBUTING SYSTEMS.

1,365,502.     Specification of Letters Patent.     Patented Jan. 11, 1921.

Application filed October 6, 1917. Serial No. 195,075.

*To all whom it may concern:*

Be it known that I, ARTHUR F. KNIGHT, a citizen of the United States, residing at Schenectady, in the county of Schenectady, State of New York, have invented certain new and useful Improvements in the Prevention of Objectionable Voltage Fluctuations on Distributing Systems.

My invention relates to systems of distribution comprising a source of current and a load circuit which is adapted to be connected to or disconnected from said source and by reason of its connection to and disconnection from said source causes a considerable fluctuation in the current load upon said generator.

The object of my invention is to control the rate of change of the current in a source of current, when connecting a load circuit thereto or disconnecting a load circuit therefrom, so that the voltage of said source remains substantially uniform without materially affecting the operation of the load circuit.

My invention may most readily be explained by reference to one of the several distribution systems to which it is applicable and in which a generator supplies current to a lighting circuit, upon which for satisfactory operation the voltage should remain substantially uniform, and to a motor, which is frequently started and stopped and is of such size that the current drawn in starting the motor and the current interrupted in stopping the motor is a relatively large proportion of the current capacity of the generator. In such a system if the rate of building up and building down of the current in the motor be not controlled in some way, a considerable fluctuation in the voltage of the generator and hence in the voltage impressed upon the lighting circuit will occur whenever the motor is connected to or disconnected from the generator.

In many kinds of service and particularly where an unbalanced load is handled by the motor, as in elevator and hoisting systems, it is essential that the motor develop its maximum torque at starting and hence automatic motor starters responsive to the electrical conditions within the motor for controlling the current in the motor cannot be used since they limit the torque of the motor at the same time that they limit the motor current. Furthermore, in service of the character referred to it is essential that the full torque of the motor be obtained, upon the manipulation of the motor controller, without appreciable delay. I have discovered that if the building up of the current upon starting the motor and the building down of the current upon stopping the motor be restricted to an approximately uniform rate, this rate can be made such that substantially no fluctuation in the generator voltage occurs and such that the time required to secure full starting current or to reduce the current to zero is not materially increased over the time required when the building up and building down of the current is not controlled.

In accordance with my invention, I provide means whereby, when connecting a load circuit to a source of current, the building up of the current in said circuit is limited to a rate such that said source is able to supply the increasing current demand without substantial variation in its voltage and without substantially limiting, or delaying the attainment of, the maximum current in said load circuit and whereby, when disconnecting said load circuit from said source of current, the building down of the current in said circuit is limited to a rate such that the said source is able to supply the decreasing current demand without substantial variation in its voltage and without substantially delaying the reduction of the load current to zero.

My invention may best be understood by referring to the drawing, the single figure of which is a diagrammatic view of a distribution system embodying my invention.

In said figure, 1 represents a generator connected to the direct current busses 2 and 3 from which a lighting circuit 4 and a motor 5 are adapted to be operated. The motor 5 comprises an armature 6 and a field winding 7. The field winding 7 is adapted to be connected directly across the busses through the segments 8 and 9 and the sliding contact 10 carried by the arm of the controller 11. The motor 5 is also supplied with an electromagnetic brake 12 which is adapted when deënergized to engage with a rotating part of the motor and when energized to be disengaged from said rotating part. The right hand side of the armature 6 is connected to the bus 2. The left hand side of the armature 6 is connected, through the controlling resistances 13 and 14, to the resistance 15 from which taps lead to the stationary contacts 16, 17, 18, 19, 20 and 21 which are carried by and insulated from the stationary support 22 of the connecting device 23. A movable support 24 carries a plurality of contacts 25, 26, 27, 28, 29 and 30 which are insulated therefrom and adapted to engage with the contacts 16, 17, 18, 19, 20 and 21 respectively, when the support 24 is raised. The stationary support 22 also carries a contact 31 which is insulated therefrom and connected through the operating winding of the brake 12 to bus 2. The movable support 24 also carries a contact 32 which is insulated therefrom and is adapted to engage with contact 31 when the yoke 24 is raised. The contacts 25, 26, 27, 28, 29, 30 and 32 are electrically connected to the bus 3 and are adjusted, by means of the locknuts 33, so as to come into engagement with their respective stationary contacts at different times. The support 24 is guided in its movement by means of the spindles 34 which are surrounded by springs which tend to separate the support 24 from the support 22. The support 24 is adapted to be raised by means of the core 35, connected thereto, and the winding 36, one terminal of which is connected to the bus 3 and the other terminal of which is connected, when the contactor 37 is closed, to the bus 2. The controlling resistances 13 and 14 are adapted to be short circuited by means of the contactors 38 and 39. The operating windings of the contactors 37, 38 and 39 are connected in common to the bus 3 and individually to the controller contact segments 40, 41, and 42 with which the contact 43, which is carried by the arm of the controller and is connected to the bus 2, is adapted to engage. As indicated in the drawing, the contacts 10 and 43 are insulated from each other.

The operation of the system is as follows:
Assume the lighting circuit 4 to be connected to the busses 2 and 3 and assume the arm of the controller 11 to be in off position, which is indicated by the letter $a$. The field winding 7 of the motor 5 will therefore be deënergized, the contactors 37, 38 and 39 will be open, the movable support 24 will be in its lower position and the brake 12 will be applied. If now it be desired to start the motor, the controller arm will be moved through position $b$, where the field winding 7 is energized, to position $c$ where the contactor 37 is operated to energize the winding 36 and to cause the movable support 24 with the contacts carried thereby to be quickly raised. The movement of the support 24 causes the contacts 25, 26, 27, 28, 29, 30 and 32 to engage with contacts 16, 17, 18, 19, 20, 21 and 31 in rapid succession with the result that the resistance 15 is cut out of the motor circuit in rapidly succeeding steps and after it has all been removed the brake 12 is rendered inoperative. By moving the controller arm to positions $d$ and $e$ the controlling resistances 13 and 14 can be rendered ineffective. Similarly, movement of the controller arm back to the position $a$ deënergizes the contactors 39, 38 and 37. Upon the deënergization of contactor 37 the movable support 24 is separated from the support 22 and the contacts 32, 30, 29, 28, 27, 26 and 25 are disengaged from the contacts 31, 21, 20, 19, 18, 17 and 16 respectively in the order named with the result that the brake 12 is first applied and the resistance 15 is then inserted in rapidly succeeding steps until the last contact 25 disengages from contact 16 when the connection between the armature 5 and the bus 3 is interrupted.

The connecting device 23 does not function as a motor starter but rather controls the rate of the building up of the current to a value corresponding to the value of the current which will flow if the full voltage of the busses is initially impressed upon the armature 6 and resistances 13 and 14, when starting the motor, and the building down of the current to zero, when stopping the motor. Indeed it has been found that, if the cutting in or cutting out of consecutive resistance steps does not cause current fluctuation exceeding about 1/6 of the full load current of the generator, the steps may be made to occur at intervals of less than 1/50 of a second without objectionable fluctuation in the generator voltage. The time required for the operation of the device 23 is, therefore, so brief that the behavior of the motor 5 is not materially affected by its employment. Although in the system illustrated, a brake 12 is employed, it is, of course, evident that in many instances it is unnecessary.

While I have illustrated diagrammatically one way in which my invention may be carried into effect, I do not wish to be limited to the particular embodiment illustrated and described, but seek to cover in the appended claims all such modifications as come within the scope and spirit of my invention.

What I claim as new and desire to secure by Letters Patent of the United States, is:

1. The combination with a load circuit, a generator adapted to supply current to said load circuit, a load adapted to be connected to said circuit and to produce if connected directly to said circuit a current change therein exceeding the rate at which said generator can supply current to said circuit and maintain a constant voltage, a resistance, and means for connecting said load to said circuit through said resistance and for automatically cutting out said resistance at such a rate that the current supplied to said load builds up to its maximum value at a rate of which said generator can supply the increase in current and still maintain the voltage impressed upon said load circuit constant and in substantially the same time as that required if the load were connected directly to the circuit.

2. The combination with a load circuit, a generator adapted to supply current to said load circuit, a load adapted to be connected to said circuit and to produce if connected directly to said circuit a current change therein exceeding the rate at which said generator can supply current to said circuit and maintain a constant voltage, a resistance, and means for connecting said load to said circuit through said resistance and for automatically cutting out said resistance at such a rate that the current supplied to said load increases at substantially the maximum rate at which said generator can supply an increase in current and still maintain the voltage impressed upon said load circuit constant.

3. The combination with a load circuit, a generator adapted to supply current to said load circuit, a load adapted to be connected to said circuit and to produce if connected directly to said circuit a current change therein exceeding the rate at which said generator can supply current to said circuit and maintain a constant voltage, a resistance, a connecting device having a plurality of contacts adjusted to be closed in a predetermined sequence when the device is operated to connect said load to said circuit through said resistance and to automatically cut out said resistance at such a rate that the current supplied to said load builds up to its maximum value at a rate at which said generator can supply the increase in current and still maintain the voltage impressed upon said load circuit constant and in substantially the same time as that required if the load were connected directly to the circuit, and means for operating said connecting device.

4. The combination with a load circuit, a generator adapted to supply current to said load circuit, a load adapted to be connected to said circuit and to produce if connected directly to said circuit a current change therein exceeding the rate at which said generator can supply current to said circuit and maintain a constant voltage, a resistance, a connecting device having a plurality of contacts adjusted to be closed in a predetermined sequence when the device is operated to connect said load to said circuit through said resistance and to automatically cut out said resistance at such a rate that the current supplied to said load circuit increases at substantially the maximum rate at which said generator can supply an increase in current and still maintain the voltage impressed upon said load circuit constant, and means for operating said connecting device.

5. The combination with a load circuit, a generator adapted to supply current to said load circuit, a load connected to said circuit and adapted to produce when disconnected therefrom a current change therein exceeding the rate at which said generator is able to supply current to said circuit at a constant voltage, a resistance, and means for cutting in said resistance in series with said load when disconnecting it from said circuit at such a rate that the current supplied to said load decreases to zero at a rate at which said generator can supply the decrease in current and still maintain the voltage impressed upon said load circuit constant and in substantially the same time as that required if the load were disconnected without inserting said resistance.

6. The combination with a load circuit, a generator adapted to supply current to said load circuit, a load connected to said circuit and adapted to produce when disconnected therefrom a current change therein exceeding the rate at which said generator is able to supply current to said circuit at a constant voltage, a resistance, and means for cutting in said resistance in series with said load when disconnecting it from said circuit at such a rate that the current supplied to said load decreases at substantially the maximum rate at which said generator can supply a decrease in current and still maintain the voltage impressed upon said load circuit constant.

7. The combination with a load circuit, a generator adapted to supply current to said load circuit, a load connected to said circuit and adapted to produce when disconnected therefrom a current change therein exceeding the rate at which said generator is able to supply current to said circuit at a constant voltage, a resistance, a connecting device having a plurality of contacts adjusted to be operated in a predetermined sequence when the device is operated to cut in said resistance in series with said load when disconnecting it from said circuit at such a rate that the current supplied to said load decreases to zero at a rate at which said generator can supply the decrease in current and still maintain the voltage impressed upon said load circuit constant and in substantially the same time as that required if the load were disconnected without inserting said resistance, and means for operating said connecting device.

8. The combination with a load circuit, a generator adapted to supply current to said load circuit, a load connected to said circuit and adapted to produce when disconnected therefrom a current change therein exceeding the rate at which said generator is able to supply current to said circuit at a constant voltage, a resistance, a connecting device having a plurality of contacts adjusted to be operated in a predetermined sequence when the device is operated to cut in said resistance in series with said load when disconnecting it from said circuit at such a rate that the current supplied to said load decreases at substantially the maximum rate at which said generator can supply a decrease in current and still maintain the voltage impressed upon said load circuit constant, and means for operating said disconnecting device.

In witness whereof, I have hereunto set my hand this 4th day of October, 1917.

ARTHUR F. KNIGHT.